(12) United States Patent
Maginnis

(10) Patent No.: US 6,505,135 B2
(45) Date of Patent: Jan. 7, 2003

(54) INITIALIZATION ALGORITHM FOR DRIVE CONTROL IN A CORIOLIS FLOWMETER

(75) Inventor: Richard L. Maginnis, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 47 days.

(21) Appl. No.: 09/805,271

(22) Filed: Mar. 13, 2001

(65) Prior Publication Data
US 2002/0133307 A1 Sep. 19, 2002

(51) Int. Cl.[7] ................................................. G01F 1/84
(52) U.S. Cl. .................... 702/100; 702/54; 73/861.354; 73/861.355; 73/861.356
(58) Field of Search ............................ 702/100, 45, 54, 702/194; 73/861.356, 861.354, 861.355, 861.357

(56) References Cited

U.S. PATENT DOCUMENTS

| 4,801,897 | A | 1/1989 | Flecken |
| 5,555,190 | A | 9/1996 | Derby et al. |
| 5,804,742 | A | 9/1998 | Rademacher-Dubbick |
| 6,199,022 | B1 * | 3/2001 | Cunningham ............... 702/194 |
| 6,230,104 | B1 * | 5/2001 | Shelley et al. ................ 702/45 |
| 6,318,186 | B1 * | 11/2001 | Smith et al. ........... 73/861.356 |
| 6,378,354 | B1 * | 4/2002 | Sharp ......................... 73/1.16 |

FOREIGN PATENT DOCUMENTS

| WO | WO 99/17084 A1 | 4/1999 |
| WO | WO 01/01084 A1 | 1/2001 |

* cited by examiner

Primary Examiner—Kamini Shah
(74) Attorney, Agent, or Firm—Faegre & Benson LLP

(57) ABSTRACT

A system for initializing parameters in a drive circuit. This invention applies initial drive signals to a drive circuit which causes said flow tube to vibrate. The configuration of the flow tube is then determined from pick-off signals received from pick-off sensors associated with the flow tube. Parameters for generation of said drive signals are then set based upon the configuration of said flow tube.

90 Claims, 9 Drawing Sheets

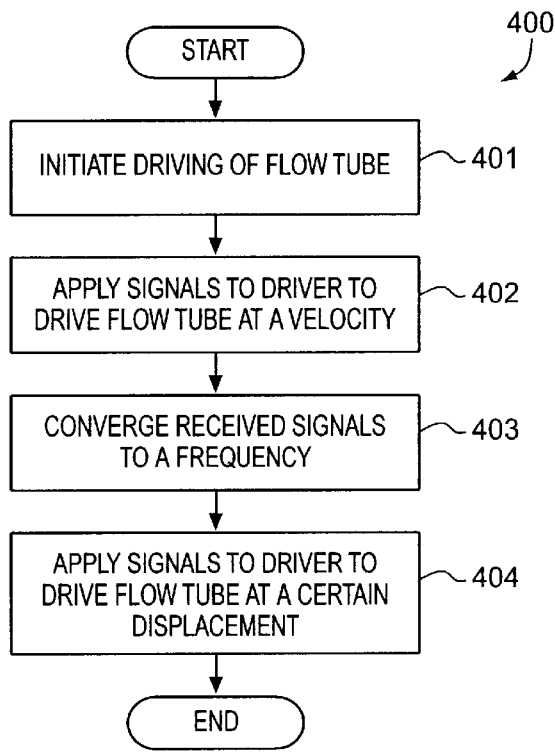
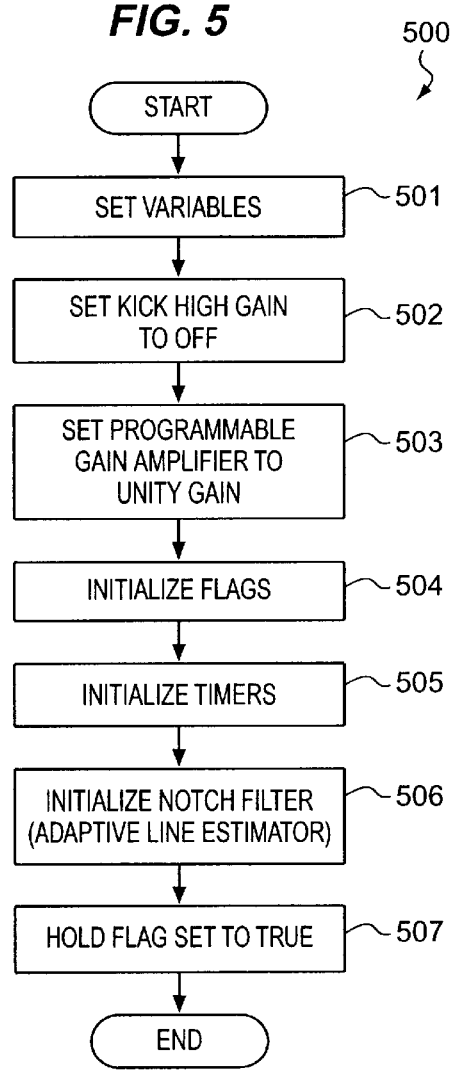
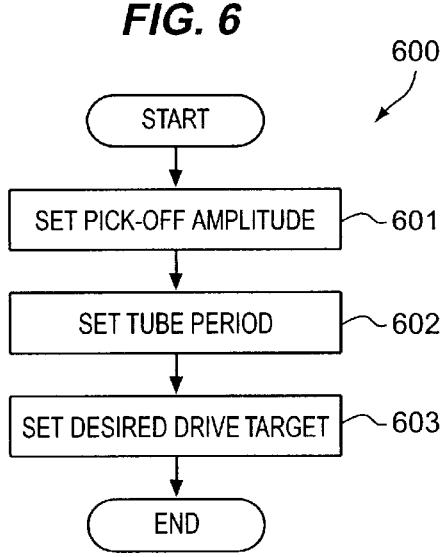

INITIALIZATION ALGORITHM FOR DRIVE CONTROL IN A CORIOLIS FLOWMETER

FIELD OF THE INVENTION

This invention relates to electronic components for controlling a drive signal in an apparatus that measures properties of material flowing through at least one vibrating conduit in the apparatus. More particularly, this invention relates to an algorithm used to initialize and maintain a drive signal that oscillates the conduit at a desired frequency.

PROBLEM

It is known to use Coriolis effect mass flowmeters to measure mass flow and other information for materials flowing through a conduit in the flowmeter. Exemplary Coriolis flowmeters are disclosed in U.S. Pat. No. 4,109,524 of Aug. 29, 1978, U.S. Pat. No. 4,491,025 of Jan. 1, 1985, and Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

Meter electronics generates a drive signal to operate the driver and determines a mass flow rate and other properties of a material from signals received from the pick-off sensors. Conventional meter electronics are made of analog circuitry which is designed to generate the drive signal and detect the signals from the pick-off sensors. Analog meter electronics have been optimized over the years and have become relatively cheap to manufacture. It is therefore desirable to design Coriolis flowmeters that can use conventional meter electronics.

It is a problem that conventional meter electronics must work with signals in a narrow range of operating frequencies. This range of operating frequencies is typically between 20 Hz and 200 Hz. This limits the designers to generating a narrow range of drive signals that will resonate the flow tubes at these frequencies. Therefore, it is ineffective to use conventional meterelectronics to generate the drive signals for some flowmeters, such as a straight tube flowmeter, which operate in a higher frequency range of 300 Hz–800 Hz. Straight tube flowmeters operate at 300 Hz–800 Hz because straight tubes tend to exhibit smaller sensitivity to Coriolis effects used to measure mass flow rate. Therefore, conventional meter electronics cannot effectively be used to generate the drive signal for straight tube flowmeters.

Those skilled in the Coriolis flowmeter art desire to design meter electronics that can be used with several different types of flowmeters. This would allow the manufacturers to take advantage of economies of scale to produce less expensive meter electronics for flowmeters. A digital signal processor is desirable because the higher demand in measurement resolution and accuracy put on analog electronic components by flowmeters operating at higher frequencies, such as straight tube designs, are avoided by the digitalization of signals from the pick-offs as the signals are received by the meter electronics. Furthermore, the instructions for signaling processes used by a digital processor may be modified to operate at several different frequencies for both determining the properties of a material and generating the drive signals.

One problem in designing meter electronics, that is to be used with several different types of flowmeters, is the start up or initialization of the flowmeter. Straight tube flowmeters are highly damped when compared to a dual curved tube counterpart. Typically, a straight tube flowmeter has zeta values on the order of $10^{-4}$ which causes the straight tube flowmeters to be an order of magnitude more damped. This makes starting the straight tube flowmeters problematic.

One particular problem in starting a straight tube flowmeter is when the material flowing through the meter includes entrained air. The entrained air causes problems on start up as it is difficult to get a reliable reading of the proper drive frequency. At the same time, one must ensure not to overstress the sensor due to excess drive excitation on start up. Therefore, most current start operations stall or in other words never reach the desired drive frequency. Thus, a more reliable start up algorithm is needed in order to provide meter electronics that can be used with any type of flowmeter.

SOLUTION

The above and other problems are solved and an advance in the art is made by a drive algorithm for a Coriolis flowmeter in accordance with this invention. A first advantage of this invention is that a reliable start up for many types of Coriolis flowmeters under many types of material flow is ensured. A second advantage is that normal flow operation is maintained under varying flow conditions including flow conditions that cause existing Coriolis flowmeters to stall.

A drive algorithm in accordance with this invention is performed by meter electronics used to control operation of a Coriolis flowmeter. In a preferred embodiment, the meter electronics include a processor that executes instructions for the drive algorithm that are stored in a memory associated with the processor. Alternatively, this algorithm may also be performed by firmware or other types of circuitry.

A drive algorithm in accordance with this invention is performed in the following manner to assure proper start up of a Coriolis flowmeter. The algorithm begins by applying signals to a driver at a predetermined gain to initiate vibrating of a flow tube. The vibration of the flow tube is measured by pick-off signals received from pick-off sensors associated with the flow tube. The voltage of signals applied to the driver are then controlled to maintain a velocity of pick-off signals received from the pick-off sensors. The pick-off signals are then used to converge a notch filter to a drive frequency of the flow tube. After the notch filter is converged upon the drive frequency, voltage of the signals applied to the driver is controlled to maintain a displacement of the flow tubes.

The drive algorithm may also determine a frequency of oscillation of said flow tube from the pick-off signals. The frequency of oscillation may then be compared to a threshold frequency to determine whether the flow tube is a straight tube or a dual curved flow tube. If the frequency of oscillation is greater than the threshold frequency, the flow tube is a straight flow tube. If the frequency of oscillation is less than the threshold frequency, the flow tube is a dual curved flow tube.

The application of signals to the driver to initiate vibrating of the flow tube may include setting at least one variable for use in generating said drive signals. The variables may include a pick-off amplitude, a flow tube period, and a desired drive target. During application of the signals to the driver to initiate vibration, a kick gain signal is set to off and a programable gain amplifier is set to unity gain. At this time, a timer and a notch filter needed in subsequent steps may be initialized.

The determination of whether a notch filter has converged upon a drive frequency includes determining whether a time out has been reached and repeating the algorithm in response to a time out being reached.

Once the drive frequency is determined, the voltage of the drive signals is controlled to maintain displacement. In order to maintain the displacement, flowmeter parameters must be determined. The drive frequency determined by the convergence of the notch filter may be tested to determine whether the notch filter is within a desired range. If the notch filter is not in a desired range, the algorithm repeats from the beginning. The range is tested by comparing the notch filter to a minimum value and a maximum value. In a preferred embodiment, the minimum value is 30 hertz and the maximum value is 900 hertz.

In order to apply the signals to the driver to initiate vibrating of the flow tube, the amplitude of the signal may be set to an initial amplitude and an initial application time of the signals may be set. The signals are then applied at the set amplitude for a time period equaling the application time. The algorithm then determines whether the amplitudes of the pick-off signals are sufficient for the notch filter. If the amplitudes of the pick-off signals are not sufficient for the notch filter, then the amplitude and application time are adjusted and the process is repeated after a delay period. In a preferred embodiment, the amplitudes of the drive signals are adjusted by increasing a multiplying digital to analog conversion (DAC) by two and the application time is adjusted by increasing the application time by ten milliseconds. If the amplitudes of the pick-off signals do not become sufficient in a certain amount of time, the algorithm starts from the beginning for another iteration.

In a preferred embodiment, the voltage of the signals applied to the driver are controlled to maintain a velocity of pick-off signals received from pick-off sensors set at 50 millivolts.

After the notch filter converges on the drive frequency, flowmeter sensor parameters are determined. One such parameter is a proportional gain of the signals applied to the driver. A second such parameter is an integral gain of said signals applied to the driver.

After the notch filter has converged on the drive frequency and the signals are controlled to maintain a displacement, the algorithm tests to determine whether a drive loop gain is locked. The test may include determining drive error from pick-off signals received from the pick-off sensors associated with the flow tube. The algorithm may then determine whether the drive error has converged to zero. If the drive error does not converge to zero in a predetermined amount of time, the algorithm may start from the beginning.

Once a drive loop is determined to be locked, a programmable gain amplitude is set. Once the programmable gain amplitude is set, measurements are delayed for a predetermined amount of time to account for transients in the signal processing chain. The pick-off signals may then be monitored to determine whether the amplitude of the pick-off signals is maintained. If the amplitude of the pick-off signals is not maintained, a forgive process is performed. The forgive process monitors the pick-off signals for a predetermined amount of time to determine whether the amplitude returns to an appropriate level.

An aspect of the invention comprises a method for initializing a drive circuit which generates drive signals that are applied to a driver that is oscillating a flow tube, said method comprising the steps of:

applying said drive signals to said driver at a predetermined gain to initiate vibrating of said flow tube;

controlling a drive voltage of said drive signals applied to said driver to maintain a velocity of pick-off signals received from pick-off sensors associated with said flow tube, determining whether a notch filter has converged on a drive frequency of said flow tube based on said pick-off signals, and controlling said drive voltage of said drive signals applied to said driver to maintain a displacement of said flow tube in response to a determination that said notch filter has converged on said drive frequency.

Another aspect further comprises the step of:

receiving said pick-off signals from said pick-off sensors.

Another aspect comprises the step of:

determining said drive frequency of said flow tube based on said pick-off signals.

Another aspect is that said step of determining said drive frequency comprises the steps of:

comparing said drive frequency to a threshold frequency; and determining said flow tube is a straight tube responsive to said drive frequency being greater than said threshold frequency.

Another aspect is that said step of determining said drive frequency further comprises the step of:

determining said flow tube is a curved flow tube responsive to said drive frequency being less than or equal to said threshold frequency.

Another aspect is that said step of applying said drive signals to said driver to initiate vibrating of said flow tube comprises the step of:

setting at least one variable for use in generating said drive signals.

Another aspect is that said step of setting said at least one variable comprises the step of:

setting a pick-off amplitude.

Another aspect is that said pick-off amplitude is set to a desired voltage.

Another aspect is that said step of setting said at least one variable comprises the step of:

setting a flow tube period.

Another aspect is that said step of setting said at least one variable comprises the step of:

setting a desired drive target.

Another aspect is that said desired drive target is set to a target voltage divided by a target.

Another aspect is that said step of applying said drive signals to said driver to initiate vibrating of said flow tube comprises the step of:

setting a kick gain signal to off.

Another aspect is that said step of applying said drive signals to said driver to initiate vibrating of said flow tube comprises the step of:

setting a programable gain amplifier to unity gain.

Another aspect is that said step of applying said drive signals to said driver to initiate vibrating of said flow tube comprises the step of:

initializing flags.

Another aspect is that said step of applying said drive signals to said driver to initiate vibrating of said flow tube comprises the step of:

initializing a timer.

Another aspect is that said step of applying said drive signals to said driver to initiate vibrating of said flow tube comprises the step of:

initializing a notch filter.

Another aspect is that said step of determining whether said notch filter has converged comprises the steps of:

determining whether a timer has reached a time out; and returning to said step of applying drive signals to said driver in response to a determination said timer has reached said time out.

Another aspect is that said step of controlling said drive voltage of said drive signals to maintain said displacement further comprises the step of:

determining flowmeter parameters in response to a determination that said notch filter has converged to said drive frequency.

Another aspect comprises the steps of:

determining whether said notch filter has converged to a notch filter value that is within a desired range; and returning to said step of applying drive signals to said driver responsive to a determination that said notch filter value is outside said desired range.

Another aspect is that said step of determining whether said notch filter value is within said desired range comprises the step of:

comparing said notch filter value to a minimum value.

Another aspect is that said minimum value is 30 hertz.

Another aspect is that said step of determining whether said notch filter value is within said desired range comprises the step of:

comparing said notch filter value to a maximum value.

Another aspect is that said maximum value is 900 hertz.

Another aspect is that said step of applying said drive signals to said driver to initiate vibrating of said flow tube comprises the step of:

setting amplitudes of said drive signals to initial amplitudes.

Another aspect is that said step of applying said drive signals to said driver to initiate vibrating of said flow tube comprises the step of:

setting an initial application time of said drive signals.

Another aspect is that said step of applying said drive signals to said driver to initiate vibrating of said flow tube comprises the step of:

applying said drive signals to said driver for a duration of said application time.

Another aspect is that said step of applying said drive signals to said driver to initiate vibrating of said flow tube comprises the step of:

determining whether amplitudes of said pick-off signals are sufficient for said notch filter.

Another aspect is that said step of applying said drive signals to said driver to initiate vibrating of said flow tube comprises the step of:

adjusting said amplitudes of said drive signals in response to a determination that said amplitudes of said pick-off signals are not sufficient for said notch filter.

Another aspect is that said step of adjusting said amplitudes of said drive signals comprises the step of:

increasing a multiplying digital to analog conversion by two.

Another aspect is that said step of applying said drive signals to said driver to initiate vibrating of said flow tube comprises the step of:

adjusting said application time in response to a determination that said amplitudes of said drive signals are not sufficient.

Another aspect is that said step of adjusting said application time comprises the step of:

increasing said application time by ten milliseconds.

Another aspect is that said step of applying said drive signals to said driver to initiate vibrating of said flow tube comprises the steps of:

waiting a delay period; and applying said drive signals using said adjusted amplitude of said drive signals and said adjusted application time in response to waiting said delay period.

Another aspect is that said step of applying said drive signals to said driver to initiate vibrating of said flow tube comprises the step of:

determining whether a timer has reached a time out; and repeating said step of applying said drive signals to said driver in response to a determination that said timer has reached said time out.

Another aspect is that said step of controlling said drive voltage of said drive signals applied to said driver to maintain said velocity comprises maintaining said velocity at least at 50 millivolts.

Another aspect comprises the step of:

determining flowmeter sensor parameters in response to a determination said notch filter has converged upon said drive frequency.

Another aspect is that said step of determining said flowmeter sensor parameters comprises the step of:

determining a proportional gain of said drive signals applied to said driver.

Another aspect is that said step of determining said flowmeter sensor parameters comprises the step of:

determining a integral gain of said drive signals applied to said driver.

Another aspect is that said step of controlling said drive voltage of said drive signals applied to said driver to maintain said displacement comprises the step of:

testing to determine whether a drive loop gain is locked.

Another aspect is that said step of testing comprises the step of:

determining drive error from said pick-off signals received from said pick-off sensors associated with said flow tube.

Another aspect is that said step of testing to determine whether a drive loop gain is locked further comprises the step of:

determining whether said drive error has converged to zero.

Another aspect is that said step of testing to determine whether a drive loop gain is locked comprises the steps of:
determining whether a timer has reached a time out; and
repeating said step of applying said drive signals to said driver responsive to said timer reaching said time out.

Another aspect is that said step of testing to determine whether a drive loop gain is locked further comprises:
repeating said step of applying said drive signals to said driver responsive to a determination said drive loop gain is not locked.

Another aspect is that said step of controlling said driver voltage of said drive signals applied to said driver to maintain said displacement comprises the steps of:
setting a programmable gain amplitude;
generating said drive signals to maintain an amplitude of said pick-off signals from said pick-off sensors associated with said flow tube;
determining whether said amplitude of said pick-off signals is maintained; and
performing a forgive process in response to said amplitude of said pick-off signals not being maintained.

Another aspect is that said step of controlling said drive voltage of said drive signals applied to said driver to maintain a displacement further comprises the step of:
delaying measurements of said pick-off signals for a predetermined amount of time to account for transients.

Another aspect is that said step of performing said forgive process comprises the steps of:
holding a last delta time calculation;
determining whether said amplitude of said pick-off signals returns to said maintained amplitude in a given amount of time; and
repeating said step of applying said driver signals to said driver in response to a determination that said amplitude of said pick-off signals did not return to said maintained amplitude of said pick-off signals in said given amount of time.

Another aspect comprises an apparatus for measuring a process parameter of a material having a flow tube through which said material flows, a driver that vibrates said flow tube, pick-off sensors associated with said flow tube to measure said vibrations, and meter electronics that generate drive signals transmitted to said driver to vibrate said flow tube and that receives pick-off signals from said pick-off sensors, said apparatus further comprising:
circuitry in said meter electronics configured to:
a.) apply said drive signals to said driver at a predetermined gain to initiate vibrating of said flow tube;
b.) control a drive voltage of said drive signals applied to said driver to maintain a velocity of said pick-off signals received from said pick-off sensors;
c.) determine whether a notch filter has converged to a drive frequency of said flow tube based on said pick-off signals; and
d.) control said drive voltage of said drive signals applied to said driver to maintain a displacement of said flow tube in response to a determination that said notch filter has converged on said drive frequency.

A further aspect comprises:
circuitry in said meter electronics configured to receive said pick-off signals from said pick-off sensors.

A further aspect comprises:
circuitry in said meter electronics configured to determine said drive frequency of said flow tube based on said pick-off signals.

Another aspect is that said circuitry is configured to:
compare said drive frequency to a threshold frequency, and determine said flow tube is a straight tube responsive to said drive frequency being greater than said threshold frequency.

Another aspect is that said circuitry is configured to:
determine said flow tube is a curved flow tube responsive to said drive frequency being less than or equal to said threshold frequency.

Another aspect is that said circuitry is configured to:
set at least one variable for use in generating said drive signals.

Another aspect is that said circuitry is configured to:
set a pick-off amplitude.

Another aspect is that said pick-off amplitude is set to a desired voltage.

Another aspect is that said circuitry is configured to:
a flow tube period.

Another aspect is that said circuitry is configured to:
set a desired drive target.

Another aspect is that said desired drive target is set to a target voltage divided by a target frequency.

Another aspect is that said circuitry is configured to:
set a kick gain signal to off.

Another aspect is that said circuitry is configured to:
set a programable gain amplifier to unity gain.

Another aspect is that said circuitry is configured to initialize flags.

Another aspect is that said circuitry is configured to initialize a timer.

Another aspect is that said circuitry is configured to initialize a notch filter.

Another aspect is that said circuitry is configured to:
determine whether a timer has reached a time out and return to circuitry in response to a determination said timer has reached said time out.

Another aspect is that said circuitry is configured to:
determine flowmeter parameters in response to a determination that said notch filter has converged to said drive frequency.

Another aspect is that said circuitry further comprises:
circuitry in said meter electronics configured to determine whether said notch filter has converged to a notch filter value that is within a desired range, and return to operation a.) responsive to a determination that said notch filter value is outside said desired range.

Another aspect is that said circuitry is configured to:
compare said notch filter value to a minimum value.

Another aspect is that said minimum value is 30 hertz.

Another aspect is that said circuitry is configured to:
compare said notch filter value to a maximum value.

Another aspect is that said maximum value is 900 hertz.

Another aspect is that said circuitry is configured to:
set amplitudes of said drive signals to initial amplitudes.

Another aspect is that said circuitry is configured to:
set an initial application time of said drive signals.

Another aspect is that said circuitry is configured to:
apply said drive signals to said driver for a duration of said application time.

Another aspect is that said circuitry is configured to:
determine whether amplitudes of said pick-off signals are sufficient for said notch filter.

Another aspect is that said circuitry is configured to:
adjust said amplitudes of said drive signals in response to a determination that said amplitudes of said pick-off signals are not sufficient for said notch filter.

Another aspect is that said circuitry is configured to:
increase a multiplying digital to analog conversion by two.
Another aspect is that said circuitry is configured to:
adjust said application time in response to a determination that said amplitudes of said drive signals are not sufficient.
Another aspect is that said circuitry is configured to:
increase said application time by ten milliseconds.
Another aspect is that said circuitry is configured to:
wait a delay period and apply said driver signals using said adjusted amplitude of said drive signals and said adjusted application time in response to waiting said delay period.
Another aspect is that said circuitry is configured to:
determine whether a timer has reached a time out and repeat operation a.) in response to a determination that said time out period ended.
Another aspect is that said circuitry is configured to maintain said velocity to at least at 50 millivolts.
Another aspect is that said circuitry is configured to:
determine flowmeter sensor parameters in response to a determination said notch filter has converged upon said drive frequency.
Another aspect is that said circuitry is configured to:
determine a proportional gain of said drive signals applied to said driver.
Another aspect is that said circuitry is configured to:
determine an integral gain of said drive signals applied to said driver.
Another aspect is that said circuitry is configured to:
perform a test to determine whether a drive loop gain is locked.
Another aspect is that said circuitry is configured to:
determine drive error from said pick-off signals received from said pick-off sensors associated with said flow tube.
Another aspect is that said circuitry is configured to:
determine whether said drive error has converged to zero.
Another aspect is that said circuitry is configured to:
determine whether a timer has reached time out, and repeat operation a.) responsive to said timer reaching said time out.
Another aspect is that said circuitry is configured to:
repeat operation a.) responsive to a determination said drive loop gain is not locked.
Another aspect is that said circuitry is configured to:
set a programmable gain amplitude, generate said drive signals to maintain an amplitude of said pick-off signals from said pick-off sensors associated with said flow tube, determine whether said amplitude of said pick-off signals is maintained, and perform a forgive process in response to said amplitude of said pick-off signals not being maintained.
Another aspect is that said circuitry is configured to:
delay measurements of said pick-off signals for a predetermined amount of time to account for transients.
Another aspect is that said circuitry is configured to:
determine whether said amplitude of said pick-off signals returns to said maintained amplitude in a given amount of time, and repeat operation a.) in response to a determination that said amplitude did not return to said maintained amplitude of said pick-off signals in said given amount of time.

DESCRIPTION OF THE DRAWINGS

The present invention can be understood from the following detailed description and the following drawings:

FIG. 4 illustrates a flow diagram of the operations performed by meter electronics in accordance with this invention;

FIG. 5 illustrates a flow diagram of a process for initializing a drive circuit system in accordance with this invention;

FIG. 6 illustrates a flow diagram for setting parameters in the initializing process in accordance with this invention;

DETAILED DESCRIPTION

Figure 1:
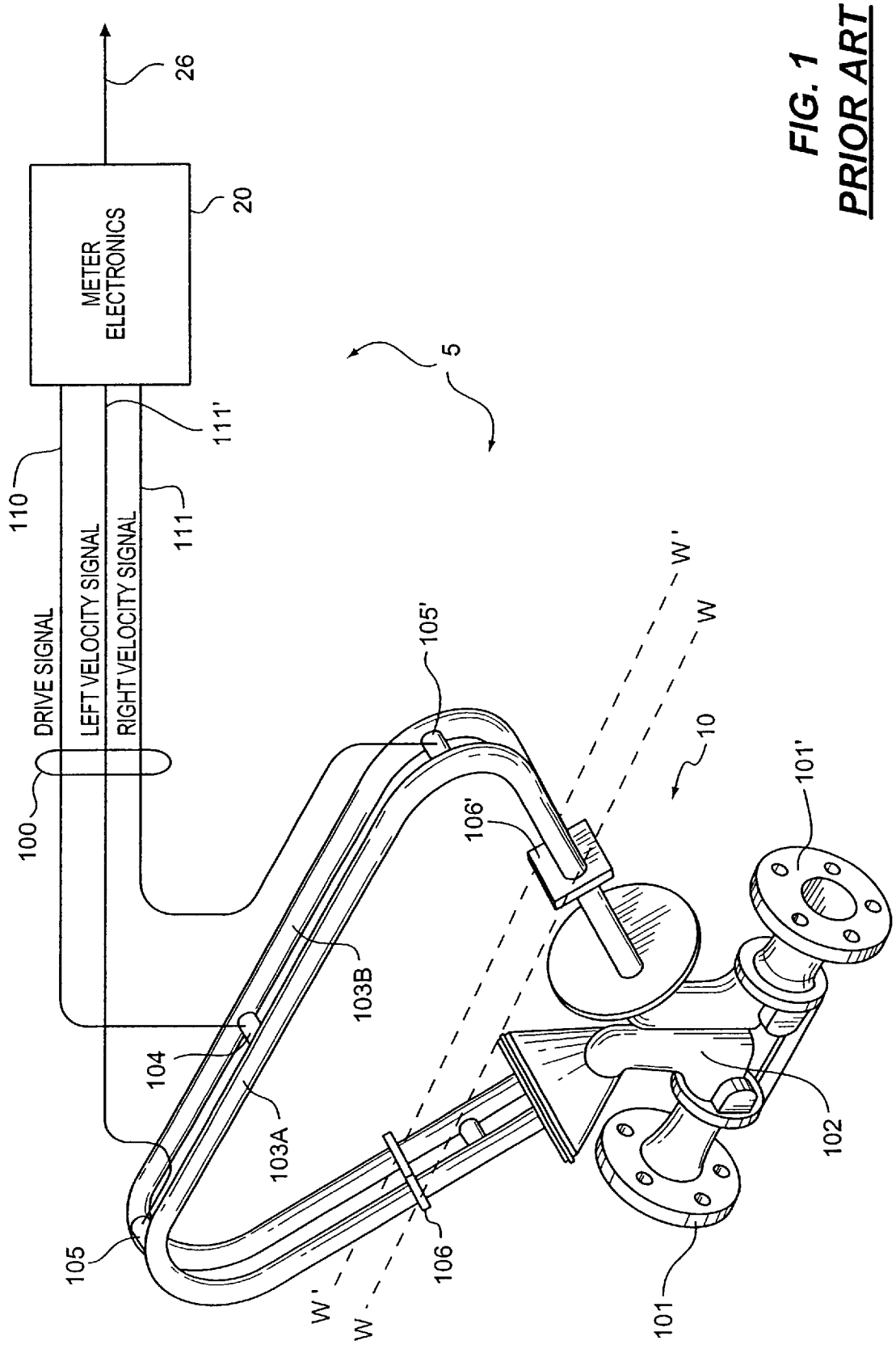
FIG. 1 illustrates a dual-loop Coriolis Flowmeter having meter electronics that perform the processes for parameter initialization in accordance with this invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Coriolis Flowmeter in General—FIG. 1

FIG. 1 shows a Coriolis flowmeter 5 comprising a Coriolis meter assembly 10 and meter electronics 20. Meter electronics 20 is connected to meter assembly 10 via leads 100 to provide density, mass flow rate, volume flow rate and totalized mass flow information over path 26. A Coriolis flowmeter structure is described although it is apparent to those skilled in the art that the present invention could be practiced in conjunction with any apparatus having a vibrating conduit to measure properties of material. A second example of such an apparatus is a vibrating tube densitometer which does not have the additional measurement capability provided by a Coriolis mass flowmeter.

Meter assembly 10 includes a pair of flanges 101 and 101', manifold 102 and conduits 103A and 103B. Driver 104, pick-off sensor 105 and pick-off sensor 105' are connected to conduits 103A and 103B. Brace bars 106 and 106' serve to define the axis W and W' about which each conduit oscillates.

When flowmeter 5 is inserted into a pipeline system (not shown) which carries the process material that is being measured, material enters meter assembly 10 through flange 101, passes through manifold 102 where the material is directed to enter conduits 103A and 103B, flows through conduits 103A and 103B and back into manifold 102 from where it exits meter assembly 10 through flange 101'.

Conduits 103A and 103B are selected and appropriately mounted to the manifold 102 so as to have substantially the same mass distribution, moments of inertia and elastic modules about bending axes W—W and W'—W', respectively. The conduits extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. Meter electronics 20 could include a transmitter. Meter electronics 20 applies a suitable drive signal via lead 110 to driver 104.

Meter electronics 20 receives the left and right velocity signals appearing on leads 111 and 111', respectively. Meter electronics 20 produces the drive signal appearing on lead 110 and causing driver 104 to vibrate tubes 103A and 103B. Meter electronics 20 processes the left and right velocity signals to compute the mass flow rate and the density of the material passing through meter assembly 10. This information is applied to path 26.

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

Figure 2:
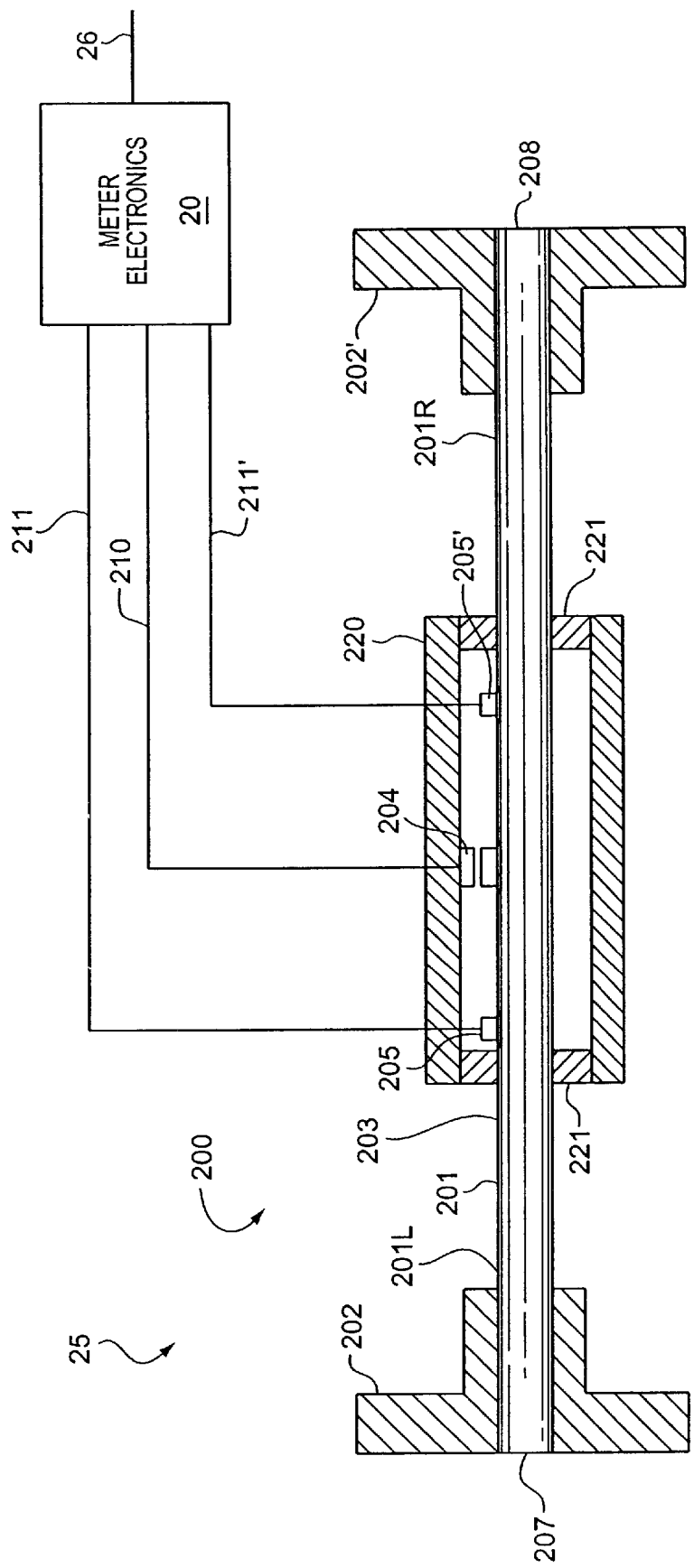
FIG. 2 illustrates a straight tube Coriolis flow meter having meter electronics that perform the processes for parameter initialization in accordance with this invention.

A Straight Tube Coriolis Flowmeter—FIG. 2

FIG. 2 discloses a straight tube Coriolis flowmeter 25. Coriolis flowmeter 25 is comprised of Coriolis sensor 200 and associated meter electronics 20. The flow tube 201 includes a left end portion thereof designated 201L in a right end portion thereof designated 201R. Flow tube 201 and its end portions extend the entire length of the flowmeter 25 from the input end 207 of flow tube 201 to the output end 208 of flow tube 201. The balance bar 220 is connected at its ends to flow tube 201 by brace bar 221.

Left end portion 201L of flow tube 201 is affixed to inlet flange 202 and right end portion 201R is affixed to outlet flange 202'. Inlet flange 202 and outlet flange 202' connect Coriolis sensor 200 to a pipeline.

In a well known conventional manner, a driver 204, a left pick-off 205 and a right pick-off 205' are coupled to flow tube 201 and balance bar 220. Driver 204 receives signals over path 210 from meter electronics 20 to cause driver 204 to vibrate flow tube 201 and balance bar 220 in-phase opposition at the resonant frequency of the material filled flow tube 201. The oscillation of vibrating flow tube 201 together with the material flow therein induces Coriolis deflections in the flow tube in a well known manner. These Coriolis deflections are detected by pick-offs 205 and 205' with the outputs of these pick-offs being transmitted over conductors 211 and 211' to meter electronics 20.

Figure 3:
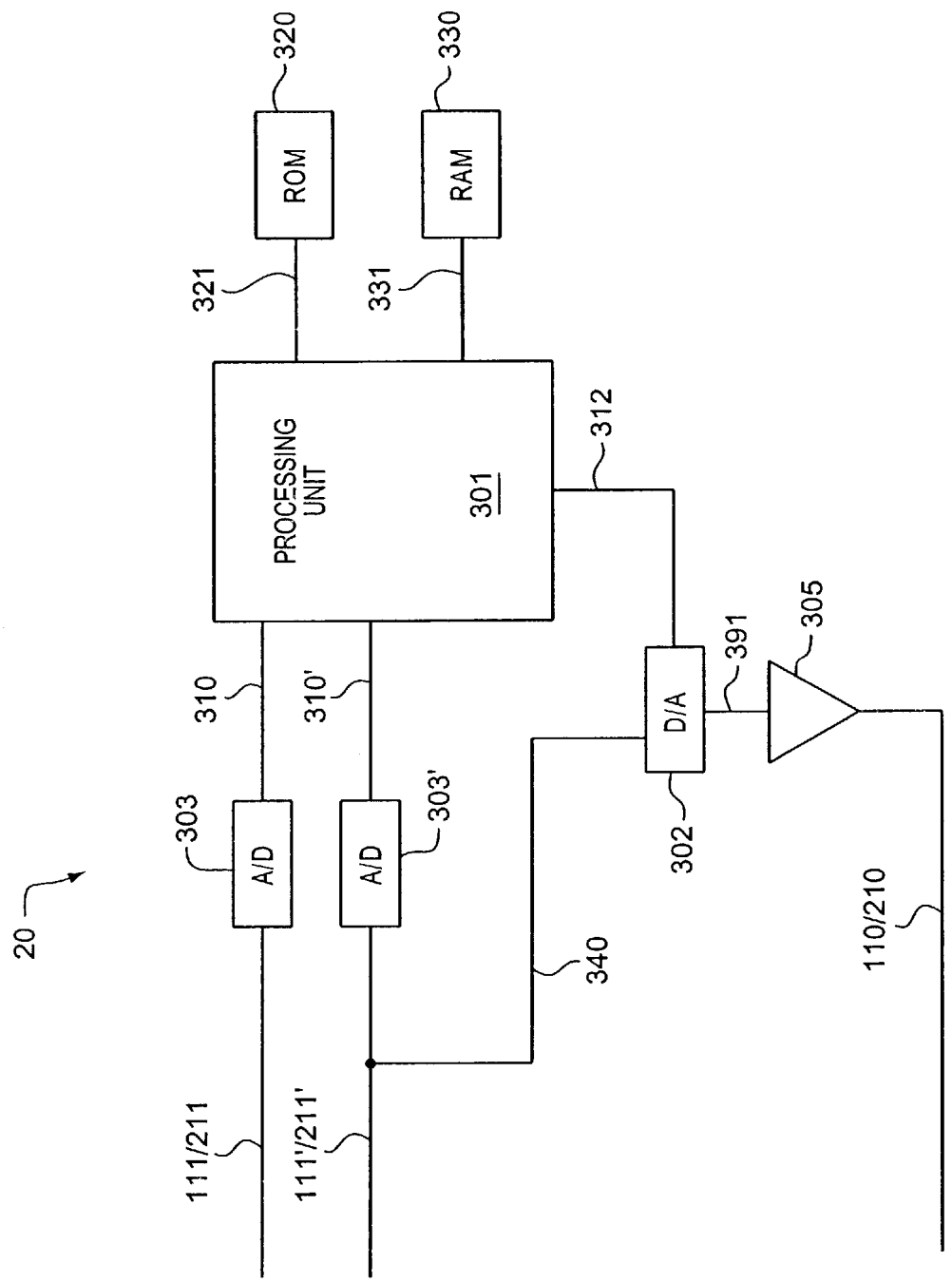
FIG. 3 illustrates a block diagram of meter electronics in accordance with this invention.

Meter Electronics—FIG. 3

FIG. 3 illustrates a block diagram of the components of meter electronics 20. Paths 111 and 111' transmit the left and right velocity signals from flowmeter assembly 10 to meter electronics 20. The velocity signals are received by analog to digital (A/D) convertors 303, 303' in meter electronic 20. A/D convertors 303, 303' convert the left and right velocity signals to digital signals usable by processing unit 301 and transmit the digital signals over paths 310–310'. Although shown as separate components, A/D convertors 303, 303' may be a signal convertor, such an AK4516 16-bit code chip manufactured by AKM of Japan, that uses multiplexing to alternately convert signals from both pick-offs 105, 105', 205, 205'. The digital signals are carried by paths 310–310' to processing unit 301. One skilled in the art will recognize that any number of pick-offs and other sensors, such as an RTD sensor for determining the temperature of the flow tube, may be connected to processing unit 301.

Driver signals are transmitted over path 312 which applies the signals to D/A convertor 302. D/A convertor 302 also receives current from one of pick-offs 105, 105', 205, 205' over path 340. The drive signals include instructions for modifying the current received over path 340 to generate an analog drive signal. D/A convertor 302 is common D/A convertor such as the AD7943 chip produced by Analog Devices, Inc. The analog signals from D/A convertor 302 are applied to amplifier 305 via path 391. Amplifier 305 generates a drive signal of the proper amplitude and applies the drive signal to driver 104, 204 via path 110, 210. Amplifier 305 may be a current amplifier or a voltage amplifier. The signal generated by D/A convertor 302 depends on the type of amplifier 305. Path 26 carries signals to input and output means (not shown) which allow meter electronics 20 to receive data from and convey data to an operator.

Processing unit 301 is a micro-processor, processor, or group of processors that read instructions from memory and execute the instructions to perform the various functions of the flowmeter. In a preferred embodiment, processing unit 301 is a ADSP-2185L microprocessor manufactured by Analog Devices, Inc. The functions performed include, but are not limited to, computing mass flow rate of a material, computing volume flow rate of a material, and computing density of a material from a Read Only Memory (ROM) 320 via path 321. The data as well as instructions for performing the various functions are stored in a Random Access Memory (RAM) 330. Processing unit 301 performs read and write operations in RAM memory 330 via path 331.

FIG. 4 illustrates a flow diagram of an initialization algorithm 400 performed by a processing unit to operate a Coriolis flowmeter 25 in accordance with this invention. Initialization algorithm 400 assures start up of flowmeter 25 without a stall regardless of the type of flowmeter or material being measured. Process 400 begins in step 401. In step 401, the processing unit 301 generates signals that are applied to the driver 104 to begin oscillation of the flow tube 201.

After the flow tube 201 is oscillating, the processing unit 301 generates and applies signals to the driver 204 which cause pick-off signals from pick-off sensors 205, 205' to maintain a certain velocity in step 402. It is desirable to control the pick-off signal amplitude to a certain level of volts or millivolts without the need for a frequency estimate. Controlling the pick-off signals to a certain level of volts or millivolts is referred to as a controlling velocity. The pick-off amplitude in terms of volts is proportional to the velocity of the flow tube 201 and this velocity signal comes from the pick-off sensors 205, 205' because when the flowmeter 25 starts operation there is no legitimate frequency or signal for the notch filter to estimate. With straight tube flowmeter 25, the velocity of the flow tube 201 is with respect to the balance bar 221. Yet, it is desirable to be able to control the amplitude of this velocity signal so velocity type of control is performed. Once the flowmeter 25 is operational, there is a legitimate notch output and hence there is adequate signal to noise ratio for the notch filter to lock onto the drive frequency and to switch over to a displacement or positional type control as is typical in drive circuits of most flowmeters.

The received pick-off signals are then applied to a notch filter which is converged when a drive frequency is determined in step 403. The processing unit 301 then generates and applies drive signals to the driver 204 that maintain a certain amplitude in pick-off signals from the pick-offs 205, 205' in step 404. This is termed as displacement or positional type control, which is the product of pick-off amplitude and tube period.

FIG. 5 illustrates a process 500 for initially setting up the processing unit 301 to generate and apply the initial drive signals. Process 500 begins in step 501 in which variables are loaded prior to the generating of signals. Process 600 shown in FIG. 6 is a process for loading these variables. Process 600 begins in step 601 by setting pick-off amplitude. This amplitude of a pick-off signal from a Coriolis sensor. The amplitude of the pick-off signal is used in a couple of ways during the drive algorithm. One example of where the pick-off amplitude is used is to determine the displacement of the flow tube. The first variable pick-off amplitude is loaded and converted into millivolts. This is the actual amplitude of the pick-off signals.

In step 602, the tube period is determined. This tube period is an estimate of the operating frequency of the reciprocal of the operating frequency of flowmeter 5, 25. Tube period is needed in conjunction with the pick-off amplitude in order to achieve drive control. In step 603, process 600 ends by initializing a desired target setting. The target setting is the set point for the drive algorithm and sometimes referred to as a displacement target which is given in units of millivolts per Hertz.

Referring back to FIG. 5, process 500 continues in step 502. The processing unit 301 sets a kick high gain to off. In step 503, a programmable gain amplifier is set to unity gain. The programmable gain amplifier is at the input of the A/D converter 303, 303'.

In step 504, flags needed in operation are initialized. The flags include codec programmable gain amplitude (PGA), set notch convert, and tube frequency convert. These three variables are set to false in a preferred embodiment. Since several subsequent steps require time outs, a timer is initialized as well for subsequent use in step 505.

In step 506, a notch filter is also initialized. A notch filter may also be referred to as an adaptive line estimator. The notch filter is put into a hold mode initially when the unit powers up. In a preferred embodiment, the notch filter is initialized to 500 Hertz. The 500 Hertz is used because without adequate signal to noise ratio on the pick-off signals from the pick-off sensors 105, 105', 205, 205', the notch filter will not have a signal with which to lock onto. In step 507, a hold flag is set to true. The hold flag instructs a ΔT calculation process to hold its last known value. The reason to hold the value is that during start up of the system there is little value in sending a ΔT value which ultimately creates mass flow information to the customer when the flowmeter has not come up and started properly. In a preferred embodiment, ΔT will be held to an initialized value which on power up is zero nano seconds or whatever the last known good value was. For example, typically the value held is approximately 10 seconds old or in other words, the value that was obtained 10 seconds ago. Only when the driver 104, 204 has locked onto signal and conditions are met such that we can be ensured of having a stable output as set forth below, will the process variable in this case ΔT and the frequency estimate which would be used for density, then it will be released and allowed to pass onto other applications performed by the meter electronics 20. Process 500 ends after step 507.

Figure 7:
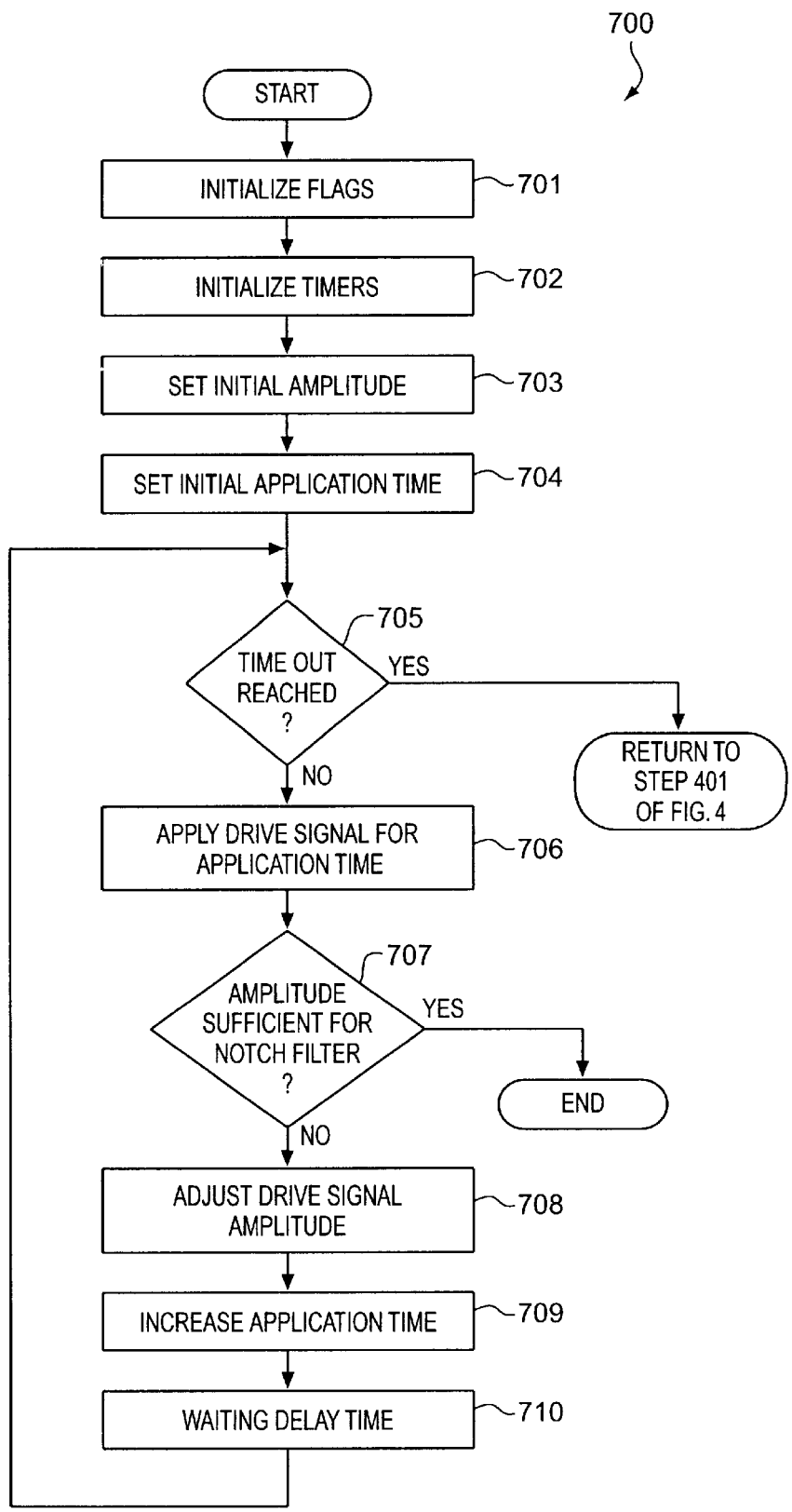
FIG. 7 illustrates a flow diagram for controlling velocity of pick-off signals in accordance with this invention.
Figure 8:
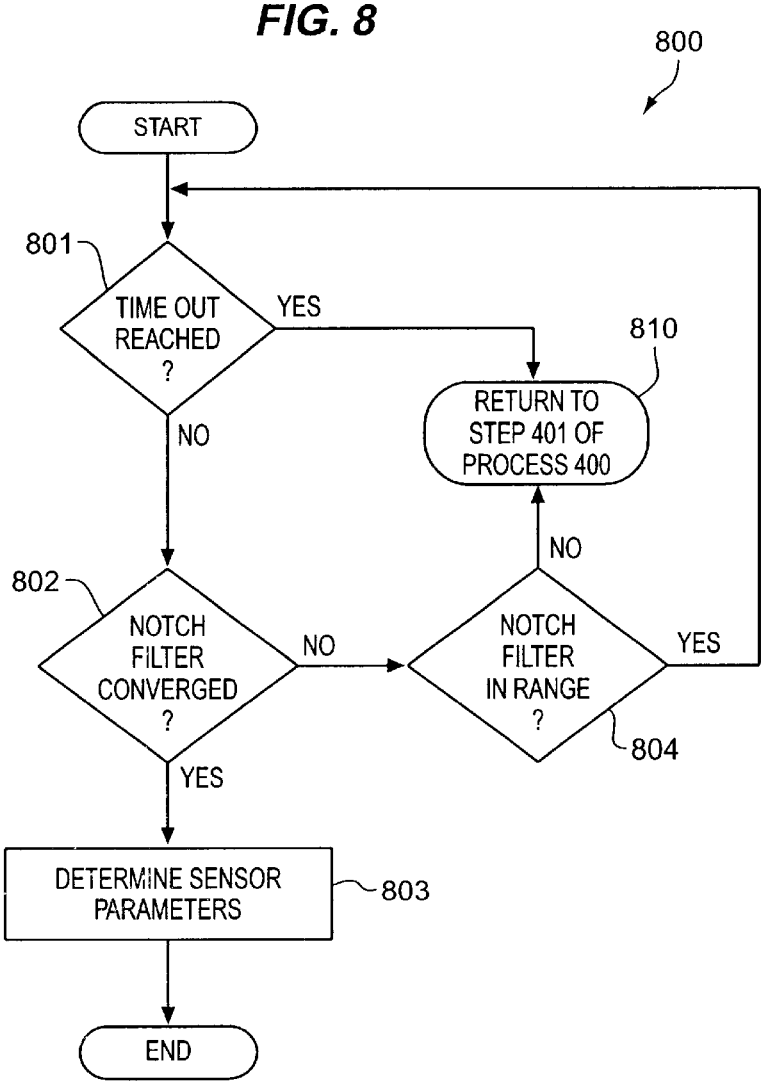
FIG. 8 illustrates a flow diagram of a process for testing for convergence of a notch filter on a drive frequency in accordance with this invention.
Figure 9:
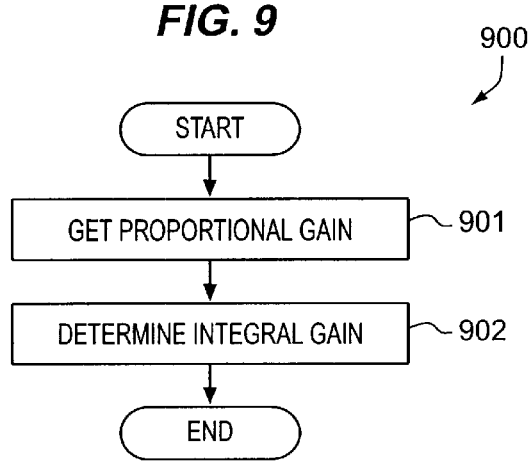
FIG. 9 illustrates a flow diagram of a process for getting flow parameters in accordance with this invention.
Figure 10:
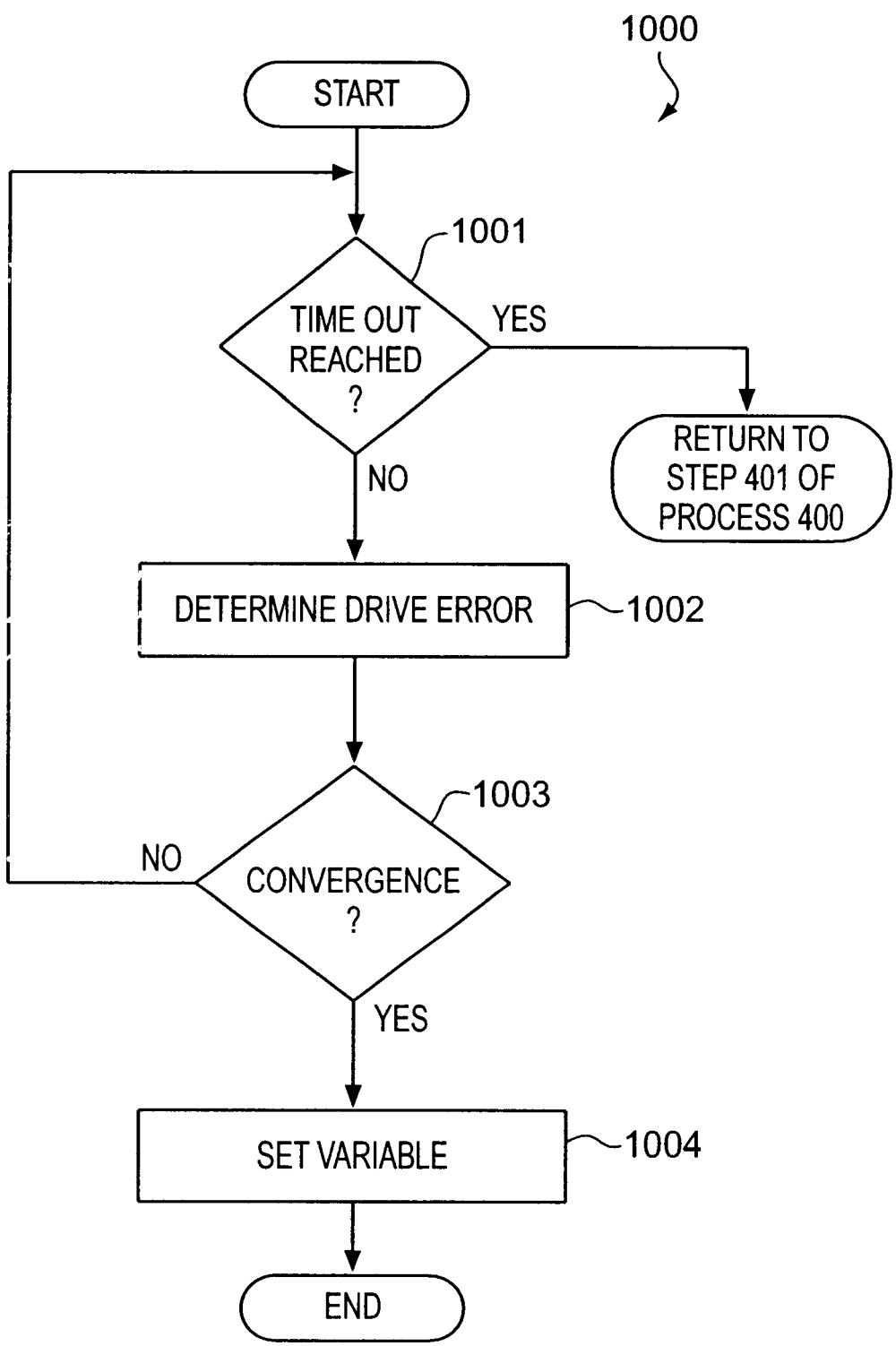
FIG. 10 illustrates a flow diagram of a test to determine whether a drive loop is locked in accordance with this invention.
Figure 11:
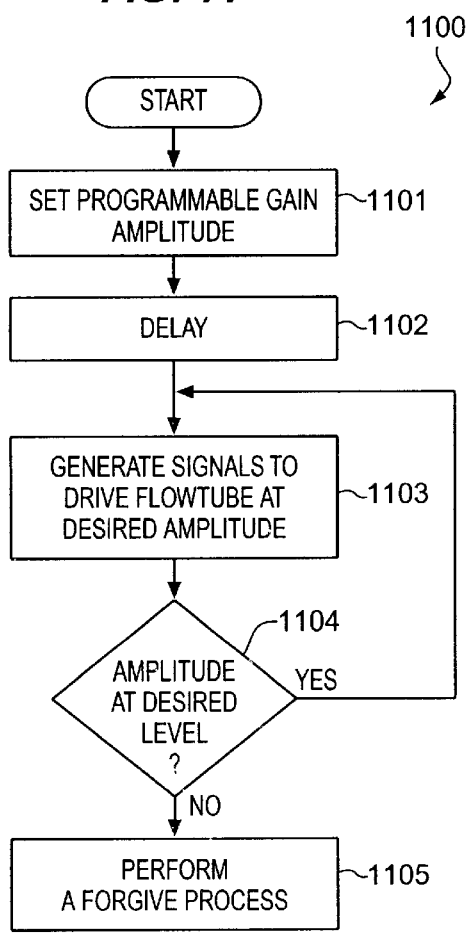
FIG. 11 illustrates a flow diagram of a process for controlling amplitudes of pick-off signals in response to the drive loop being locked in accordance with this invention.

FIG. 7 illustrates process 700 which is a process for applying drive signals to start vibration of a flow tube. This is referred to as a kick process. Process 700 involves amplification of a closed loop feedback system. Hardware gain is set at a maximum value and the pick-off sensors 105, 105', 205, 205' are allowed to start up regeneratively using whatever noise or signal is available at the pick-off sensors 105, 105', 205, 205'. The noise or signal from a pick-off sensor 105, 105', 205, 205' is fed back highly amplified and applied to the driver 104, 204. The kick process is a progressive energy algorithm. Kick process 700 gradually increases the amount of energy applied to the tube by linearly increasing the width or the time that the energy is applied as well as increasing the amplitude.

Process 700 begins in step 701 with the processing unit 301 initializing any flags needed to complete process 700. A timer is then initialized in step 702. The timer initialized is used below to measure application time and down time. The amplitude of the signal to be applied is then initialized in step 703 and the initial application time is set in step 704.

Signals are then applied in the manner set forth below going through several iterations until a sufficient amplitude of the pick-off signals is achieved.

In step 705, the processing unit 301 determines whether a time out is reached. In a preferred embodiment, the time out period is 15 seconds. If the process 700 has not achieved a sufficient pick-off signal, the process 700 returns to step 401 of process 400 to repeat the start up algorithm. If the timeout is not reached, the drive signal is applied to the driver 104, 204 for the amount of the application time in step 706. Pick-off signals are then checked in step 707 to determine whether the amplitude of the signals is sufficient to apply to the notch filter. The pick-off signals then should have adequate signal to noise ratio for the notch filter to converge on an estimate of the drive frequency. In a preferred embodiment, the amplitude is 50 millivolts. If the amplitudes of the pick-off signals are sufficient, then process 700 ends.

Otherwise, process 700 continues to step 708 where the amplitudes of the pick-off signals applied to the driver 104, 204 is adjusted. In a preferred embodiment, the amplitudes are adjusted by increasing a multiplying digital to analog conversion (DAC) by 2. In step 709, the application time is adjusted. In a preferred embodiment, ten milliseconds is added to the application time. The processing unit 301 then waits a delay time in step 710 and process 700 is repeated from step 705.

The following shows how process 700 operates in a preferred embodiment. A first pass through process 700 causes the on-time of kick process 700 to have a duration of 10 milliseconds while off-time would have a duration of 100 milliseconds. The duration of the off-time is fixed at 100 milliseconds. Every subsequent pass through steps 705 to 710 progressively increases the width of the on-time in increments of 10 milliseconds. Thus, the second call to this routine would result in a kick on-time of 20 milliseconds. The third call would be a kick on-time of 30 milliseconds, etc. During these on time intervals, the amplitude of the gain of signals applied to the driver 104, 204 is adjusted starting with a multiplying DAC value of 2 and linearly increasing this value in steps of 2.

After the amplitudes of the pick-off signals reach 50 millivolts, the processing unit 301 controls the voltage applied to the driver 104, 204 to maintain the amplitude of the pick-off signals and notch filter convergence is performed in step 403 of process 400 shown in FIG. 4. If notch convergence is not achieved within a period of time, for example 15 seconds, then process 400 repeats from step 401.

Process 800 is a process for determining whether a notch filter converges on the drive frequency. Process 800 begins by determining whether a time out period has expired. If the time period has expired, the processing unit 301 returns to step 401 of process 400 to restart the flowmeter 5, 25 in step 810.

If the time out period is not expired, the notch filter is tested for convergence in step 802. The criteria for notch convergence is based on the variance calculation of a vector of frequency estimates when the variance of this frequency estimate vector falls below a predetermined threshold, such as 0.316 Hertz squared. Once the notch filter converges to a final value, the notch filter or drive frequency is deemed stable enough to use in the drive loop when controlling displacement in the subsequent states. If the notch filter is not converged, then process 800 is repeated.

After the notch filter has obtained a converged estimate of the tube frequency, the process 800 performs process 900 in step 803. In process 900, the flowmeter 5, 25 parameters for the loop drive control are obtained. Specifically the proportional gain value is determined in step 901 and integral gain is determined in step 902. The proportional and integral gain values are read from a table as determined by the frequency estimate.

Alternatively the flowmeter parameters may be determined in the following manner. The notch filter frequency is checked to determine the type of flowmeter attached. If the frequency is above a predetermined frequency, such as 350 Hertz, then it is determined that the flowmeter 25 attached is a straight tube and those gain parameters will be loaded. If the frequency is below 350 Hertz, its been determined that the flowmeter 5 is a curved tube and the appropriate gain parameters will be loaded for that type of flowmeter. After step 803, process 800 ends.

After process 800 is completed and the notch filter is converged, the processing unit 301 may now control the drive signal via tradition position or displacement methods in step 404 of process 400. Subsequent control is based on the position of the tube using millivolts per Hertz as the target. In the case of straight tube flowmeters 25, the target has been set to a half millivolt per Hertz in a preferred embodiment.

The meter electronics 20 then performs process 1000 to perform a loop lock test. Process 1000 begins in step 1001 in which it is determined whether a time out period has ended. If the time period ends, the processing unit 301 returns to step 401 of process 400. If the time out period is not reached, then the test for loop stability is performed in step 1002. The test for loop stability or loop convergence is determined in a similar fashion as that used for notch frequency estimate conversion. For loop stability, a convergence test is performed on the drive error signal in step 1003 which is determined in step 1002. Drive error is the difference between the desired target and what is actually achieved. In the case of a straight tube flowmeter 25, the difference is a half millivolt per Hertz. In a preferred embodiment, the variance of a vector of errors is tested to be within 0.01 millivolts square per Hertz squared. When this criteria has been met, as well as the absolute value of the error meaning within 50% of the target set point, then the loop is declared to be converged and locked and appropriate variables are set to indicate this condition is step 1004 and process 1000 ends. The convergence test for drive error is effectively an energy calculation on the error signal coming out of the drive loop, since the mean or expected value of this error must be zero by design.

After process 1000 is performed and the drive loop is found stable, process 1100 is performed to maintain normal operation of the flowmeter. In step 1101, the programable gain amplitude is set. Step 1101 is an optimization of the input signal to noise ratio on the A/D converter 303, 303'. Once the programable gain amplifier is set, a delay is performed in step 1102. The delay takes into account the transients that may occur on an input data stream as a result of the changing of the gain. In a preferred embodiment, the delay time is set to a half second. Once delay expires, signals are generated, in step 1103, in accordance with the displacement or positional type control and all process variables are allowed to update normally. Specifically, $\Delta T$ is allowed to update in order that mass flow can be provided to the customer.

In step 1104, the processing unit 301 monitors amplitude of the pick-off signals. If the amplitude is not at a desired level, a forgive process is performed in step 1105. This keeps the displacement of the tube in check at the determined half millivolt per Hertz in the case of a straight tube or 3.4 millivolt per Hertz in the case of a dual curve tube. During this state, the amplitudes of the pick-off signals are monitored for sufficient signal level. As long as the signal level at the left pick-off 105, 205 remains greater than 20 millivolts, process 1100 repeats steps 1103 and 1104. If the amplitude falls below a threshold value, for example 20 millivolts, then a forgive process is performed in step 1105.

Figure 12:
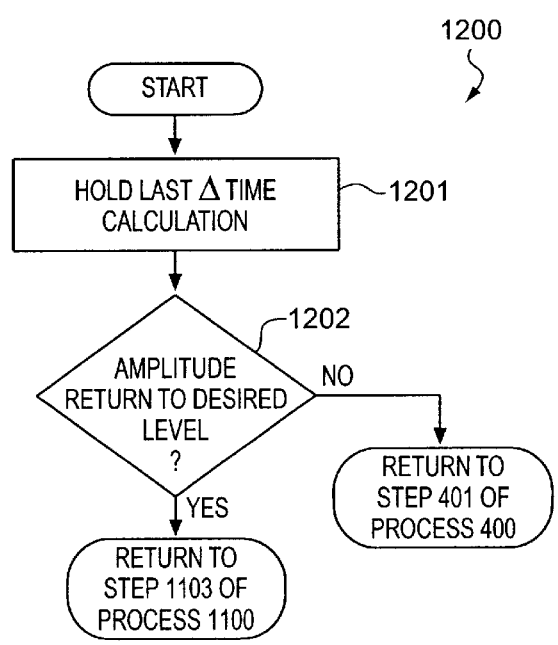
FIG. 12 illustrates a flow diagram of a forgive process in accordance with this invention.

FIG. 12 illustrates a forgive process 1200. Process 1200 begins in step 1201. In step 1201, a hold flag is set to indicate the last reliable value of delta time that is to be used by all applications. In step 1202, it is determined whether the amplitudes of the pick-off signals return to the desired level in a predetermined amount of time. If the pick-off signals return to the desired amplitudes, then process 1200 returns to step 1103 of process 1100. Otherwise, process 1200 returns to step 401 of process 400 to restart the flowmeter.

Figure 13:
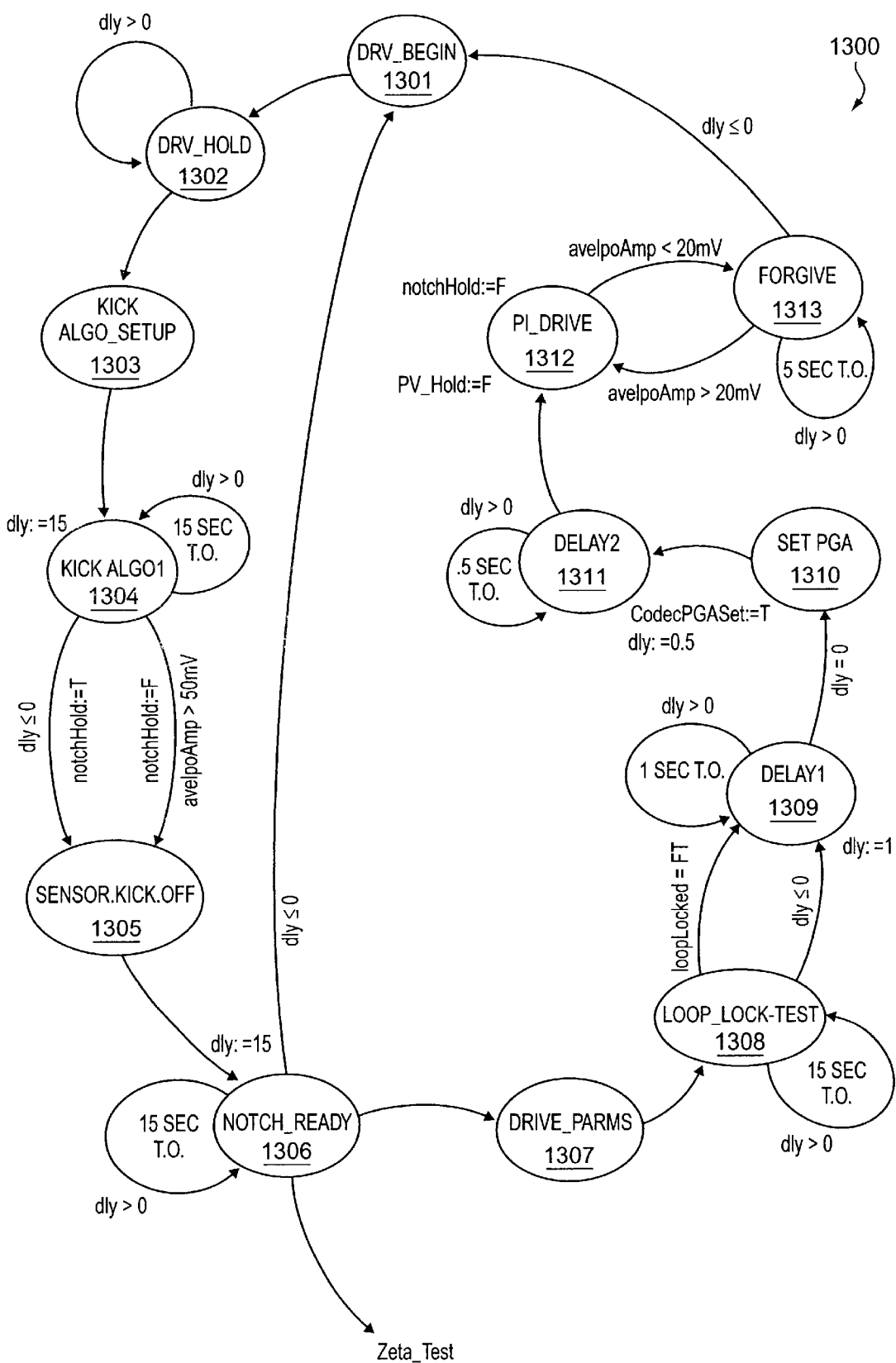
FIG. 13 illustrates a state diagram of a preferred embodiment in accordance with this invention.

FIG. 13 illustrates a state machine performed by meter-electronics 20 to provide a preferred embodiment of the algorithm of this invention. Drive algorithm 1300 is embodied by the state machine and is implemented in software. The primary function of this state machine is called Updatedrive. This function is called in the foreground of the meter electronics 20, such as the Altus meter electronics 20 manufactured by Micro Motion Inc. of Boulder, Colo. The Altus meter electronics 20 operates at 750 calls per second. This is the rate at which drive algorithm 1300 designed.

Drive algorithm 1300 begins in state 1301 in which several variables are loaded prior to the part commencing with the state machine. First is the left pick-off amplitude. The amplitude of the left pick-off signal is used in a couple of ways during drive algorithm 1300. For example, left pick-off amplitude is used to determine the displacement of the tube. Left pick-off amplitude is loaded and converted into millivolts. Left pick-off amplitude is the actual amplitude of the pick-off signals.

Tube period is also loaded. Tube period value is an estimate of the reciprocal of the operating frequency of the sensor. Tube period is used in conjunction with the pick-off amplitude in order to achieve drive control.

A desired target is also set. The desired target is the set point for the drive algorithm. The desired target is given in units of millivolts per Hertz.

The left pick-off amplitude is then filtered. The amplitude of the left pick-off is often noisy, so there is a single pole recursive filter used to smooth the left pick-off amplitude.

Once these variables have been initialized, the update drive routine is called in state 1301. State 1301 is primarily an initialization state if this is the first time that the state machine has been called, particularly on power up of the meter electronics 20. State 1301 is also an initialization state if it is the first time the driver 104, 204 is excited by a drive signal. The initialization begins by turning the kick high gain kick signal off and setting the programmable gain amplifier, which is the input at the input of the A/D converter, to achieve unity gain.

Flag signals are also initialized in state 1301. The flags include codec PGA, set notch convert and tube frequency convert. These three variables are all set to false. Since several of the states require time outs, a timer is initialized in state 1301 as well for subsequent use by states that need this timer initialized. A notch filter is also initialized to 500 Hertz. 500 hertz is used because without adequate signal to noise ratio on the input of the left pick-off, the notch filter will not have a signal with which to lock onto and it may drift. The notch filter typically drifts down towards DC making it difficult for the notch filter to capture a legitimate signal from the left pick-off once there is enough energy introduced into the drive. The notch filter is checked for a reasonable value between some minimum value and some positive larger value. Typically the minimum value is 30 Hertz and the maximum value is 900 Hertz. If it is within these values, the notch filter holds the current value. If on the other hand, the notch filter is outside of this range, then the notch filter is reset to 500 Hertz. During the course of the drive algorithm 1300 under normal conditions, the drive error signal, which is the difference between actual frequency and the desired target frequency. A convergence test is performed and an initialization for drive error signal test to be performed later is done here in state 1301. Likewise, a convergence test is performed on the adaptive line estimator output.

A flag called PV__Hold is set to true in state 1301. The PV-Hold flag instructs the $\Delta T$ calculation process to hold its last known value. The reason for this is that during start up of the system there is little value in sending a $\Delta T$ value which ultimately creates mass flow information to the customer when the sensor has not started properly. During slug flow condition and start up, $\Delta T$ is held to an initialized value which is zero nano seconds or the last known good value. The last know good value is approximately 10 seconds old, and is the value that was obtained 10 seconds ago. Once the driver 104, 204 has locked onto a signal and the systems are locked, the process variable, in this case $\Delta T$, and the frequency estimate are released and allowed to pass onto other applications.

Finally, a delay of $1/750$ seconds is provided by state 1302. The delay allows time for the A/D buffers to fill with known good data as the flow tube begins to vibrate in subsequent states. This filling of the buffer with good data ensures the minimum threshold conditions for returning to state 1301 do not occur because of corrupt or old data. The delay allows transient conditions in the data stream to pass before state 1303 is entered.

After the delay in state 1302, state 1303 is entered. State 1303 is an initialization function for a kick algorithm described in the state 1304. State 1303 also initializes a timer to ensure state 1304 will time out after a predetermined amount of time. The time is set at 15 seconds.

In state 1304, vibration of the flow tube commences. This is known as a kick process. A kick process fundamentally involves amplification of a closed loop feedback system. Hardware gain is set at a maximum value and the flowmeter 5, 25 is allowed to start up regeneratively using whatever noise or signal is available at the pick-off flowmeter 5, 25 is fed back highly amplified on the board and then sent to a drive coil. The kick algorithm of state 1304 is referred to as a progressive energy algorithm. The kick algorithm gradually increases the amount of energy applied to the tube by linearly increasing the width or the time that the energy is applied as well as increasing the amplitude.

This kick algorithm or progressive algorithm includes five states. The first pass through the algorithm causes the on-time of the kick to have a duration of 10 milliseconds while its off-time would have a duration of 100 milliseconds. The duration of the off time is fixed at 100 milliseconds. Every subsequent call to the kick algorithm progressively increases the width of the on-time intervals by increments of 10 milliseconds. Thus, the second call to the kick algorithm results in a kick-on time of 20 milliseconds. The third call would be a kick on-time of 30 milliseconds. During the on-time intervals, the amplitude of the gain is adjusted starting with a multiplying DAC value of 2 and linearly increasing this value in steps of 2.

The purpose for the progressive duty cycle excitations is to safely start the tube without overdue stresses being imparted into the structure. Once 50 millivolts of pick-off signal is achieved, state 1305 is entered. State 1305 is a sensor kick off algorithm. In state 1305, the amplitude of the pick-off signals is sufficient for the notch filter and the notch hold variable is set to false. Setting the notch hold variable to false allows the adaptive notch filter to attempt to estimate tube frequency.

Alternatively, state 1304 progresses to state 1305 after the time out of 15 seconds has occurred. The notch filter attempts to lock onto a drive frequency given that there is not sufficient amplitude so that the notch hold variable remains set to true. When the notch hold variable is true, it is guaranteed that the state machine returns back to the starting state 1301 from state 1305 and algorithm 1300 is repeated. This process will continue until there is sufficient amplitude of at least 50 millivolts in the pick-off signals.

State 1305 completes the kick off algorithm and initializes a time out timer for notch ready state 1306. In state 1306, a first attempt to control the tube is made and a call to a function PI Drive is made. PI drive is a velocity control that is not dependent upon the sensor drive frequency i.e. the notch estimate. Subsequent calls in state 1306 attempt to maintain 50 millivolts of pick-off signal while the notch filter is checked for output convergence. If notch convergence is not achieved within 15 seconds, state 1306 returns back to the starting state 1301 to repeat drive algorithm 1300. The criteria for notch convergence is based on the variance calculation of a vector of frequency estimates when the variance of this frequency estimate vector falls below a predetermined threshold of 0.316 Hertz squared. When state 1306 determines that the notch has converged to its final value, the drive frequency is deemed stable enough to use in the drive loop when controlling on displacement in the subsequent states.

When the notch filter has converged to its final value and the notch estimator obtains a converged estimate of the tube frequency, state 1307 is entered. In state 1307, the sensor perimeters for the loop drive control are obtained. Specifically, the proportional and integral gain values are read from a table as determined by the frequency estimate. If the frequency is above 350 Hertz, then state 1307 determines that the flowmeter attached is a straight tube and gain parameters for a straight tube are loaded. If the frequency estimate is below 350 Hertz, then state 1307 determines that the flowmeter is a curved tube and the appropriate gain parameters for curved tube sensors are loaded.

State 1307 also changes the target type from velocity to position or displacement. Thus subsequent control of the drive signals is based on the position of the tube using millivolts per Hertz as the target. In the case of straight tube sensors, the target has been set to a half millivolt per Hertz.

The state machine advances to state 1308 entitled loop lock test. In state 1308, a call to a proportional integral drive control function is made. The proportional integral drive control is based on displacement or positional control. Previously loaded drive loop gain parameters are used in the proportional integral drive control function.

At this time, state 1308 performs a test for loop stability. The test for loop stability or loop convergence performed in state 1308 is determined in a similar fashion as that used for notch frequency estimate conversion. For loop stability, a convergence test is performed on the drive error signal. The drive error signal is the difference between the desired target and actual frequency. In the case of a straight tube, the desired target is a half millivolt per Hertz. For a straight tube, the variance of a vector of errors is tested to be within 0.01 millivolts square per Hertz squared. When this variance is met and the absolute value of the error is within 50% of the target set point, the loop is declared to be converged. Appropriate variables are set by state 1308 to indicate the loop is stable. The convergence test is effectively an energy calculation on the error signal coming out of the PI Drive loop, since the mean or expected value of this error must be 0 by design.

State 1308 also has a 15 second time out period. After the time out is completed, drive algorithm 1300 advances to state 1309 regardless of whether the loop achieves a stable lock or not. State 1309 is a delay 1 state. State 1308 is actually redundant and plays little role in algorithm 1300. State 1309 is a legacy in this embodiment.

Algorithm 1300 advances to state 1310. State 1310 is set programable gain amplitude (PGA) in which optimization of the input signal to noise ratio on the A/D converter 303, 303' is performed. Once the programable gain amplifier setting has been made, algorithm 1300 advances to state 1311. State 1311 is a delay state that takes into account the transients that may occur on the input data stream from the pick-off signals as a result of the changing of the gain. The delay time in state 1311 is set. Once this delay time of a half second expires, the algorithm advances to the PI-DRIVE state 1312.

Algorithm 1300 spends a majority of normal operation in state 1312. State 1312 sets all flags to allow all process variables to update normally. Specifically, ΔT is allowed to update in order that mass flow can be provided to the customer through other applications. Up to this time, the other application have held ΔT at a last known good value. In addition, a PI drive control function is executed in state 1312. The function of PI drive control is to continually keep the displacement of the tube in check at the determined threshold. In the case of a straight tube flowmeter, the threshold is a half millivolt per Hertz. In the case of a dual tube curved configuration, the threshold is 3.4 millivolts per Hertz.

During state 1312, the amplitude of the pick-off signals is monitored for sufficient signal level. While signal level at the left pick-off remains greater than a threshold, for example 20 millivolts, state 1312 continues normal operation. If the amplitude falls below the threshold, algorithm 1300 advances to state 1313 entitled forgive.

State 1313 has a time out of 5 seconds. Therefore, recovery of the sensor amplitude must occur during this 5 second interval or algorithm 1300 returns to 1301 and is repeated. During forgive state 1313, the process variable flag is set to hold. This prevents updates of the ΔT specifically to be held in a last known good value during the time out period. If the amplitude of the pick-off signals increases back above the desired threshold, then algorithm 1300 returns to state 1312 and continues to control as a part of normal operation. The process variable flag is set false once again allowing ΔT updates to occur. While algorithm 1300 is in state 1313, the notch estimate is likely to be degraded. Therefore, the notch filter is held so that the filter cannot drift down to an inappropriate value.

The above is a description of drive algorithm for a Coriolis flowmeter. It is expected that those skilled in can and will design alternative drive algorithms that infringe on this invention as set forth in the claims below either literally or through the Doctrine of Equivalents.

What is claimed is:

1. A method for initializing a drive circuit which generates drive signals that are applied to a driver that is oscillating a flow tube, said method comprising the steps of:

applying said drive signals to said driver at a predetermined gain to initiate vibrating of said flow tube;

controlling a drive voltage of said drive signals applied to said driver to maintain a velocity of pick-off signals received from pick-off sensors associated with said flow tube;

determining whether a notch filter has converged on a drive frequency of said flow tube based on said pick-off signals; and controlling said drive voltage of said drive signals applied to said driver to maintain a displacement of said flow tube in response to a determination that said notch filter has converged on said drive frequency.

2. The method of claim 1 further comprising the step of:
receiving said pick-off signals from said pick-off sensors.

3. The method of claim 2 further comprising the step of:
determining said drive frequency of said flow tube based on said pick-off signals.

4. The method of claim 3 wherein said step of determining said drive frequency comprises the steps of:

comparing said drive frequency to a threshold frequency; and determining said flow tube is a straight tube responsive to said drive frequency being greater than said threshold frequency.

5. The method of claim 4 wherein said step of determining said drive frequency further comprises the step of:

determining said flow tube is a curved flow tube responsive to said drive frequency being less than or equal to said threshold frequency.

6. The method of claim 1 wherein said step of applying said drive signals to said driver to initiate vibrating of said flow tube comprises the step of:

setting at least one variable for use in generating said drive signals.

7. The method of claim 6 wherein said step of setting said at least one variable comprises the step of:

setting a pick-off amplitude.

8. The method of claim 7 wherein said pick-off amplitude is set to a desired voltage.

9. The method of claim 6 wherein said step of setting said at least one variable comprises the step of:

setting a flow tube period.

10. The method of claim 6 wherein said step of setting said at least one variable comprises the step of:

setting a desired drive target.

11. The method of claim 10 wherein said desired drive target is set to a target voltage divided by a target.

12. The method of claim 1 wherein said step of applying said drive signals to said driver to initiate vibrating of said flow tube comprises the step of:

setting a kick gain signal to off.

13. The method of claim 1 wherein said step of applying said drive signals to said driver to initiate vibrating of said flow tube comprises the step of:

setting a programable gain amplifier to unity gain.

14. The method of claim 1 wherein said step of applying said drive signals to said driver to initiate vibrating of said flow tube comprises the step of:

initializing flags.

15. The method of claim 1 wherein said step of applying said drive signals to said driver to initiate vibrating of said flow tube comprises the step of:

initializing a timer.

16. The method of claim 1 wherein said step of applying said drive signals to said driver to initiate vibrating of said flow tube comprises the step of:

initializing a notch filter.

17. The method of claim 1 wherein said step of determining whether said notch filter has converged comprises the steps of:

determining whether a timer has reached a time out; and returning to said step of applying drive signals to said driver in response to a determination said timer has reached said time out.

18. The method of claim 1 wherein said step of controlling said drive voltage of said drive signals to maintain said displacement further comprises the step of:

determining flowmeter parameters in response to a determination that said notch filter has converged to said drive frequency.

19. The method of claim 1 further comprising the steps of:

determining whether said notch filter has converged to a notch filter value that is within a desired range; and returning to said step of applying drive signals to said driver responsive to a determination that said notch filter value is outside said desired range.

20. The method of claim 19 wherein said step of determining whether said notch filter value is within said desired range comprises the step of:

comparing said notch filter value to a minimum value.

21. The method of claim 20 wherein said minimum value is 30 hertz.

22. The method of claim 19 wherein said step of determining whether said notch filter value is within said desired range comprises the step of:

comparing said notch filter value to a maximum value.

23. The method of claim 22 wherein said maximum value is 900 hertz.

24. The method of claim 1 wherein said step of applying said drive signals to said driver to initiate vibrating of said flow tube comprises the step of:

setting amplitudes of said drive signals to initial amplitudes.

25. The method of claim 24 wherein said step of applying said drive signals to said driver to initiate vibrating of said flow tube comprises the step of:

setting an initial application time of said drive signals.

26. The method of claim 25 wherein said step of applying said drive signals to said driver to initiate vibrating of said flow tube comprises the step of:

applying said drive signals to said driver for a duration of said application time.

27. The method of claim 26 wherein said step of applying said drive signals to said driver to initiate vibrating of said flow tube comprises the step of:

determining whether amplitudes of said pick-off signals are sufficient for said notch filter.

28. The method of claim 27 wherein said step of applying said drive signals to said driver to initiate vibrating of said flow tube comprises the step of:

adjusting said amplitudes of said drive signals in response to a determination that said amplitudes of said pick-off signals are not sufficient for said notch filter.

29. The method of claim 28 wherein said step of adjusting said amplitudes of said drive signals comprises the step of:

increasing a multiplying digital to analog conversion by two.

30. The method of claim 29 wherein said step of applying said drive signals to said driver to initiate vibrating of said flow tube comprises the step of:

adjusting said application time in response to a determination that said amplitudes of said drive signals are not sufficient.

31. The method of claim 30 wherein said step of adjusting said application time comprises the step of:

increasing said application time by ten milliseconds.

32. The method of claim 31 wherein said step of applying said drive signals to said driver to initiate vibrating of said flow tube comprises the steps of:

waiting a delay period; and applying said drive signals using said adjusted amplitudes of said drive signals and said adjusted application time in response to waiting said delay period.

33. The method of claim 1 wherein said step of applying said drive signals to said driver to initiate vibrating of said flow tube comprises the step of:

determining whether a timer has reached a time out; and repeating said step of applying said drive signals to said driver in response to a determination that said timer has reached said time out.

34. The method of claim 1 wherein said step of controlling said drive voltage of said drive signals applied to said driver to maintain said velocity comprises maintaining said velocity at least at 50 millivolts.

35. The method of claim 1 further comprising the step of:

determining flowmeter sensor parameters in response to a determination said notch filter has converged upon said drive frequency.

36. The method of claim 35 wherein said step of determining said flowmeter sensor parameters comprises the step of:

determining a proportional gain of said drive signals applied to said driver.

37. The method of claim 35 wherein said step of determining said flowmeter sensor parameters comprises the step of:
determining a integral gain of said drive signals applied to said driver.

38. The method of claim 1 wherein said step of controlling said drive voltage of said drive signals applied to said driver to maintain said displacement comprises the step of:
testing to determine whether a drive loop gain is locked.

39. The method of claim 38 wherein said step of testing to determine whether a drive loop gain is locked comprises the step of:
determining drive error from said pick-off signals received from said pick-off sensors associated with said flow tube.

40. The method of claim 39 wherein said step of testing to determine whether a drive loop gain is locked further comprises the step of:
determining whether said drive error has converged to zero.

41. The method of claim 38 wherein said step of testing to determine whether a drive loop gain is locked comprises the steps of:
determining whether a timer has reached a time out; and
repeating said step of applying said drive signals to said driver responsive to said timer reaching said time out.

42. The method of claim 38 wherein said step of testing to determine whether a drive loop gain is locked further comprises:
repeating said step of applying said drive signals to said driver responsive to a determination said drive loop gain is not locked.

43. The method of claim 1 wherein said step of controlling said drive voltage of said drive signals applied to said driver to maintain said displacement comprises the steps of:
setting a programmable gain amplitude;
generating said drive signals to maintain an amplitude of said pick-off signals from said pick-off sensors associated with said flow tube;
determining whether said amplitude of said pick-off signals is maintained; and
performing a forgive process in response to said amplitude of said pick-off signals not being maintained.

44. The method of claim 43 wherein said step of controlling said drive voltage of said drive signals applied to said driver to maintain a displacement further comprises the step of:
delaying measurements of said pick-off signals for a predetermined amount of time to account for transients.

45. The method of claim 43 wherein said step of performing said forgive process comprises the steps of:
holding a last delta time calculation;
determining whether said amplitude of said pick-off signals returns to said maintained amplitude in a given amount of time; and
repeating said step of applying said driver signals to said driver in response to a determination that said amplitude of said pick-off signals did not return to said maintained amplitude of said pick-off signals in said given amount of time.

46. An apparatus for measuring a process parameter of a material having a flow tube through which said material flows, a driver that vibrates said flow tube, pick-off sensors associated with said flow tube to measure said vibrations, and meter electronics that generate drive signals transmitted to said driver to vibrate said flow tube and that receives pick-off signals from said pick-off sensors, said apparatus further comprising:
circuitry in said meter electronics configured to:
a.) apply said drive signals to said driver at a predetermined gain to initiate vibrating of said flow tube;
b.) control a drive voltage of said drive signals applied to said driver to maintain a velocity of said pick-off signals received from said pick-off sensors;
c.) determine whether a notch filter has converged to a drive frequency of said flow tube based on said pick-off signals; and
d.) control said drive voltage of said drive signals applied to said driver to maintain a displacement of said flow tube in response to a determination that said notch filter has converged on said drive frequency.

47. The apparatus of claim 46 further comprising:
circuitry in said meter electronics configured to receive said pick-off signals from said pick-off sensors.

48. The apparatus of claim 47 further comprising:
circuitry in said meter electronics configured to determine said drive frequency of said flow tube based on said pick-off signals.

49. The apparatus of claim 48 wherein said circuitry is configured to:
compare said drive frequency to a threshold frequency, and determine said flow tube is a straight tube responsive to said drive frequency being greater than said threshold frequency.

50. The apparatus of claim 49 wherein said circuitry is configured to:
determine said flow tube is a curved flow tube responsive to said drive frequency being less than or equal to said threshold frequency.

51. The apparatus of claim 46 wherein said circuitry is configured to:
set at least one variable for use in generating said drive signals.

52. The apparatus of claim 51 wherein said circuitry is configured to:
set a pick-off amplitude.

53. The apparatus of claim 52 wherein said pick-off amplitude is set to a desired voltage.

54. The apparatus of claim 51 wherein said circuitry is configured to:
set a flow tube period.

55. The apparatus of claim 51 wherein said circuitry is configured to:
set a desired drive target.

56. The apparatus of claim 55 wherein said desired drive target is set to a target voltage divided by a target frequency.

57. The apparatus of claim 46 wherein said circuitry is configured to:
set a kick gain signal to off.

58. The apparatus of claim 46 wherein said circuitry is configured to:
set a programable gain amplifier to unity gain.

59. The apparatus of claim 46 wherein said circuitry is configured to:
initialize flags.

60. The apparatus of claim 46 wherein said circuitry is configured to:
initialize a timer.

61. The apparatus of claim 46 wherein said circuitry is configured to:
initialize a notch filter.

62. The apparatus of claim 46 wherein said circuitry is configured to:
determine whether a timer has reached a time out, and return to operation a.) in response to a determination said timer has reached said time out.

63. The apparatus of claim 46 wherein said circuitry is configured to:
determine flowmeter parameters in response to a determination that said notch filter has converged to said drive frequency.

64. The apparatus of claim 46 wherein said circuitry further comprises:
circuitry in said meter electronics configured to determine whether said notch filter has converged to a notch filter value that is within a desired range, and return to operation a.) responsive to a determination that said notch filter value is outside said desired range.

65. The apparatus of claim 64 wherein said circuitry is configured to:
compare said notch filter value to a minimum value.

66. The apparatus of claim 65 wherein said minimum value is 30 hertz.

67. The apparatus of claim 64 wherein said circuitry is configured to:
compare said notch filter value to a maximum value.

68. The apparatus of claim 67 wherein said maximum value is 900 hertz.

69. The apparatus of claim 46 wherein said circuitry is configured to:
set amplitudes of said drive signals to initial amplitudes.

70. The apparatus of claim 69 wherein said circuitry is configured to:
set an initial application time of said drive signals.

71. The apparatus of claim 70 wherein said circuitry is configured to:
apply said drive signals to said driver for a duration of said application time.

72. The apparatus of claim 71 wherein said circuitry is configured to:
determine whether amplitudes of said pick-off signals are sufficient for said notch filter.

73. The apparatus of claim 72 wherein said circuitry is configured to:
adjust said amplitudes of said drive signals in response to a determination that said amplitudes of said pick-off signals are not sufficient for said notch filter.

74. The apparatus of claim 73 wherein said circuitry is configured to:
increase a multiplying digital to analog conversion by two.

75. The apparatus of claim 74 wherein said circuitry is configured to:
adjust said application time in response to a determination that said amplitudes of said drive signals are not sufficient.

76. The apparatus of claim 75 wherein said circuitry is configured to:
increase said application time by ten milliseconds.

77. The apparatus of claim 76 wherein said circuitry is configured to:
wait a delay period and apply said drive signals using said adjusted amplitude of said drive signals and said adjusted application time in response to waiting said delay period.

78. The apparatus of claim 46 wherein said circuitry is configured to:
determine whether a timer has reached a time out, and restart operation a.) in response to a determination that said timer has reached said time out.

79. The apparatus of claim 46 wherein circuitry is configured to maintain said velocity to at least at 50 millivolts.

80. The apparatus of claim 46 wherein said circuitry is configured to:
determine flowmeter sensor parameters in response to a determination said notch filter has converged upon said drive frequency.

81. The apparatus of claim 80 wherein said is circuitry configured to:
determine a proportional gain of said drive signals applied to said driver.

82. The apparatus of claim 80 wherein said circuitry is configured to:
determine an integral gain of said drive signals applied to said driver.

83. The apparatus of claim 46 wherein said circuitry is configured to:
perform a test to determine whether a drive loop gain is locked.

84. The apparatus of claim 83 wherein said circuitry is configured to:
determine drive error from said pick-off signals received from said pick-off sensors associated with said flow tube.

85. The apparatus of claim 84 wherein said circuitry is configured to:
determine whether said drive error has converged to zero.

86. The apparatus of claim 83 wherein said circuitry is configured to:
determine whether a timer has reached time out, and repeat operation a.) responsive to said timer reaching said time out.

87. The apparatus of claim 83 wherein said circuitry is configured to:
repeat operation a.) responsive to a determination said drive loop gain is not locked.

88. The apparatus of claim 46 wherein said circuitry is configured to:
set a programmable gain amplitude, generate said drive signals to maintain an amplitude of said pick-off signals from said pick-off sensors associated with said flow tube, determine whether said amplitude of said pick-off signals is maintained, and perform a forgive process in response to said amplitude of said pick-off signals not being maintained.

89. The apparatus of claim 88 wherein said circuitry is configured to:
delay measurements of said pick-off signals for a predetermined amount of time to account for transients.

90. The apparatus of claim 88 wherein said circuitry is configured to:
determine whether said amplitude of said pick-off signals returns to said maintained amplitude in a given amount of time, and repeat operation a.) in response to a determination that said amplitude did not return to said maintained amplitude of said pick-off signals in said given amount of time.

\* \* \* \* \*

UNITED STATES PATENT AND TRADEMARK OFFICE
CERTIFICATE OF CORRECTION

PATENT NO.    : 6,505,135 B2
DATED         : January 7, 2003
INVENTOR(S)   : Richard L. Maginnis It is certified that error appears in the above-identified patent and that said Letters Patent is hereby corrected as shown below:

Column 1,
Line 62, replace "tive to use conventional meterelectronics to generate the"
with -- tive to use conventional meter electronics to generate the --

Column 16,
Line 52, replace "FIG. 13 illustrates a state machine performed by meter-" with
-- FIG. 13 illustrates a state machine performed by meter --

Signed and Sealed this

Twenty-third Day of September, 2003

JAMES E. ROGAN
*Director of the United States Patent and Trademark Office*